(12) United States Patent
Han et al.

(10) Patent No.: US 12,254,037 B2
(45) Date of Patent: Mar. 18, 2025

(54) LOG PARSING METHOD AND DEVICE, SERVER AND STORAGE MEDIUM

(71) Applicant: ZTE CORPORATION, Guangdong (CN)

(72) Inventors: Jing Han, Guangdong (CN); Jianwei Liu, Guangdong (CN); Li Chen, Guangdong (CN); Feng Ye, Guangdong (CN); Zheng Liu, Guangdong (CN); Hang Ling, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 230 days.

(21) Appl. No.: 17/624,243

(22) PCT Filed: Sep. 2, 2020

(86) PCT No.: PCT/CN2020/113060
§ 371 (c)(1),
(2) Date: Dec. 30, 2021

(87) PCT Pub. No.: WO2021/052177
PCT Pub. Date: Mar. 25, 2021

(65) Prior Publication Data
US 2022/0365957 A1 Nov. 17, 2022

(30) Foreign Application Priority Data
Sep. 20, 2019 (CN) .......................... 201910893383.2

(51) Int. Cl.
*G06F 16/00* (2019.01)
*G06F 16/31* (2019.01)
*G06F 16/353* (2025.01)

(52) U.S. Cl.
CPC .......... *G06F 16/353* (2019.01); *G06F 16/322* (2019.01)

(58) Field of Classification Search
CPC .. G06F 16/353; G06F 16/322; G06F 11/0751; G06F 17/40; G06F 16/35; G06F 16/258; H04L 41/0636; H04L 41/069
See application file for complete search history.

(56) References Cited

U.S. PATENT DOCUMENTS

2003/0061213 A1* 3/2003 Yu .......................... G06N 20/00
2016/0196174 A1 7/2016 Jacob
(Continued)

FOREIGN PATENT DOCUMENTS

| CN | 102855639 A | 1/2013 |
|---|---|---|
| CN | 107493275 A | 12/2017 |

(Continued)

OTHER PUBLICATIONS

ZTE Corporation, Extended European Search Report, EP 20866066. 2, Jun. 2, 2022, 9 pgs.
(Continued)

*Primary Examiner* — Alex Gofman
*Assistant Examiner* — Suman Rajaputra
(74) *Attorney, Agent, or Firm* — MH2 TECHNOLOGY LAW GROUP LLP

(57) ABSTRACT

Disclosed are a log parsing method and device, a server and a storage medium, relating to the field of network operation and maintenance. The method includes: acquiring (101) sample log data; performing (102) clustering processing on the sample log data according to the length of each sample log in the sample log data, and beginning and ending keywords of each sample log in the sample log data, to obtain a plurality of log clusters; determining (103) a quality score of each log cluster of the plurality of log clusters obtained by the clustering processing; and parsing (104) a log according to the plurality of log clusters and quality scores of the plurality of log clusters.

19 Claims, 6 Drawing Sheets

(56) References Cited

U.S. PATENT DOCUMENTS

| | | | | |
|---|---|---|---|---|
| 2016/0292592 A1* | 10/2016 | Patthak | ............... | G06F 16/2228 |
| 2018/0102938 A1 | 4/2018 | Yoon et al. | | |
| 2018/0165174 A1* | 6/2018 | Ajiro | ................... | G06F 11/3006 |
| 2018/0241654 A1 | 8/2018 | Danichev et al. | | |
| 2019/0138597 A1* | 5/2019 | Dowell | ................... | H04L 65/40 |
| 2020/0364254 A1* | 11/2020 | Gal | ....................... | G06F 40/295 |

FOREIGN PATENT DOCUMENTS

| | | |
|---|---|---|
| CN | 109032909 A | 12/2018 |
| CN | 109189840 A | 1/2019 |
| CN | 109242174 A | 1/2019 |
| CN | 109343990 A | 2/2019 |
| CN | 109726185 A | 5/2019 |
| CN | 109993179 A | 7/2019 |

OTHER PUBLICATIONS

Pinjia He et al., "A Directed Acyclic Graph Approach to Online Log Parsing", arxiv.org, Cornell University Library, 201 Olin Library, Cornell University, Ithaca, NY 14853, Jun. 12, 2018, 14 pgs.

Li Lu et al, "A Method of Large-Scale Log Pattern Mining", Advances in Biometrics: International Conference, ICB 2007, Seoul, Korea, Aug. 27-29, 2007; Proceedings; [Lecture Notes in Computer Science; Lect.Notes Computer], Springer, Berlin, Heidelberg, pp. 76-84, Jan. 23, 2018, 9 pgs.

ZTE Corporation, International Search Report, PCT/CN2020/113060, Nov. 30, 2020, 7 pgs.

Liang Tang, et al., "LogSig: Generating System Events from Raw Textual Logs", CIKM'11, Oct. 24-28, 2011, Glasgow, Scotland, UK, 2011 ACM, 10 pgs.

Min Du, et al., "Spell:Streaming Parsing of System Event Logs", IEEE International Conference on Data Mining (ICDM) 2016, 6 pgs.

Pinjia He, et al., "Drain: An Online Log Parsing Approach with Fixed Depth Tree", IEEE International Conference on Web Services (ICWS) 2017, 8 pgs.

Chinese Notification of Grant of Invention Patent mailed Jan. 2, 2025 in corresponding Chinese Application No. 201910893383.2, translated, 8 pages.

* cited by examiner

LOG PARSING METHOD AND DEVICE, SERVER AND STORAGE MEDIUM

CROSS REFERENCE TO RELATED APPLICATIONS

The present application is a United States National Stage Application filed under 35 U.S.C. § 371 of PCT Patent Application Serial No. PCT/CN2020/113060, filed on Sep. 2, 2020, which claims priority to Chinese patent application No. 201910893383.2, filed on Sep. 20, 2019, each of which is incorporated herein by reference in its entirety.

TECHNICAL FIELD

The embodiments of the present disclosure relate to the field of network operation and maintenance, in particular to a log parsing method.

BACKGROUND

Log parsing refers to transforming an unstructured log text into a structured log text. Log parsing plays an important role in the fields such as location of system error source, anomaly detection, etc. According to the results of the log parsing, the running sequence of programs in the system can be clearly identified, which can be further used for the construction of program workflow and anomaly detection in the system.

At present, a commonly used log parsing method includes: parsing a log template online in a streaming form according to a longest common subsequence, and usually generating a prefix tree to reduce searching time during a practical application. By allocating first several fields of the log to different nodes in the tree, a log parsing tree with a fixed depth is constructed, thereby a searching speed is increased.

The inventor found that there is at least the following problem in the related technology: the log parsing tree constructed only uses several fields of the log, which accelerates the parsing process to a certain extent, but substantially reduces the accuracy of the log parsing.

SUMMARY

Embodiments of the present disclosure aim to provide a log parsing method and device, a server and a storage medium.

Some embodiments of the present disclosure provide a log parsing method, which includes: acquiring sample log data; performing a clustering processing on the sample log data according to a length of each sample log in the sample log data, and beginning and ending keywords of each sample log in the sample log data, to obtain a plurality of log clusters; determining a quality score of each log cluster of the plurality of log clusters; and parsing a log by using the plurality of log clusters and the quality scores of the plurality of log clusters; where parsing the log includes determining an adaptive similarity threshold for the log using the quality scores of the plurality of log clusters.

Some embodiments of the present disclosure further provide a log parsing device, which includes: an acquisition module, configured to acquire sample log data; a clustering module, configured to perform a clustering processing on the sample log data according to a length of each sample log in the sample log data, and beginning and ending keywords of each sample log in the sample log data, to obtain a plurality of log clusters; a scoring module, configured to determine a quality score of each log cluster of the plurality of log clusters; and a parsing module, configured to parse a log by using the plurality of log clusters and the quality scores of the plurality of log clusters; where parsing the log includes determining an adaptive similarity threshold for the log using the quality scores of the plurality of log clusters.

Some embodiments of the present disclosure further provide a server, which includes: at least one processor; and a memory communicatively connected with the at least one processor; where the memory stores instructions executable by the at least one processor, and the instructions are executed by the at least one processor to enable the at least one processor to execute the above-described log parsing method.

Some embodiments of the present disclosure further provide a computer-readable storage medium storing a computer program. The computer program, when executed by a processor, implements the above-described log parsing method.

BRIEF DESCRIPTION OF THE DRAWINGS

One or more embodiments are described by examples with reference to the corresponding figures in the accompanying drawings, and the examples do not constitute a limitation to the embodiments.

DETAILED DESCRIPTION

Figure 1:
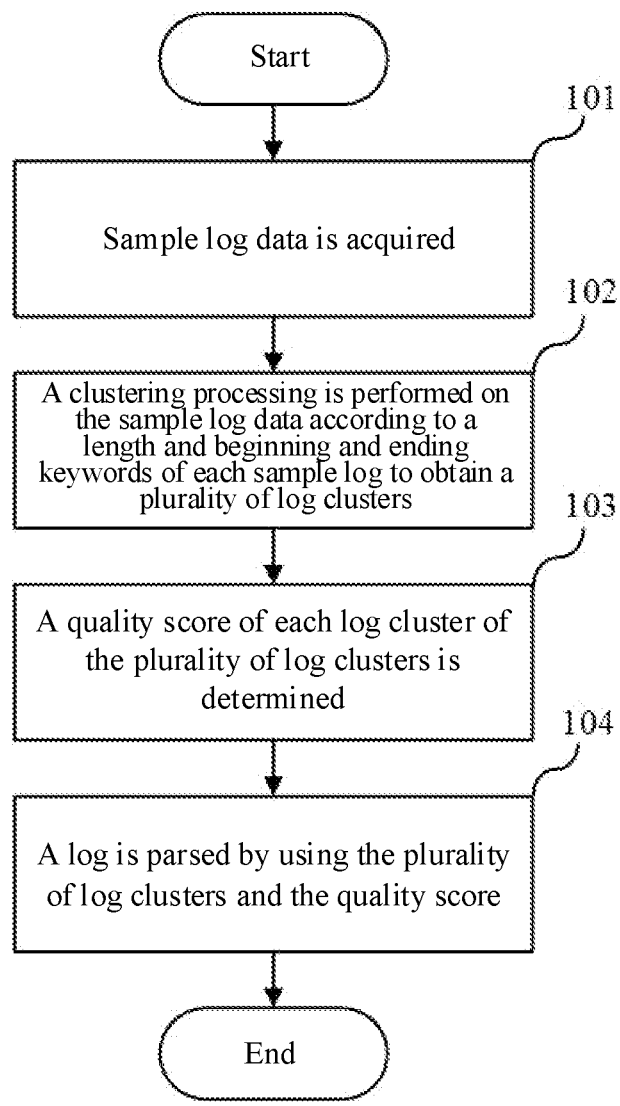
FIG. 1 is a flowchart of a log parsing method according to a first embodiment of the present disclosure.
Figure 2:
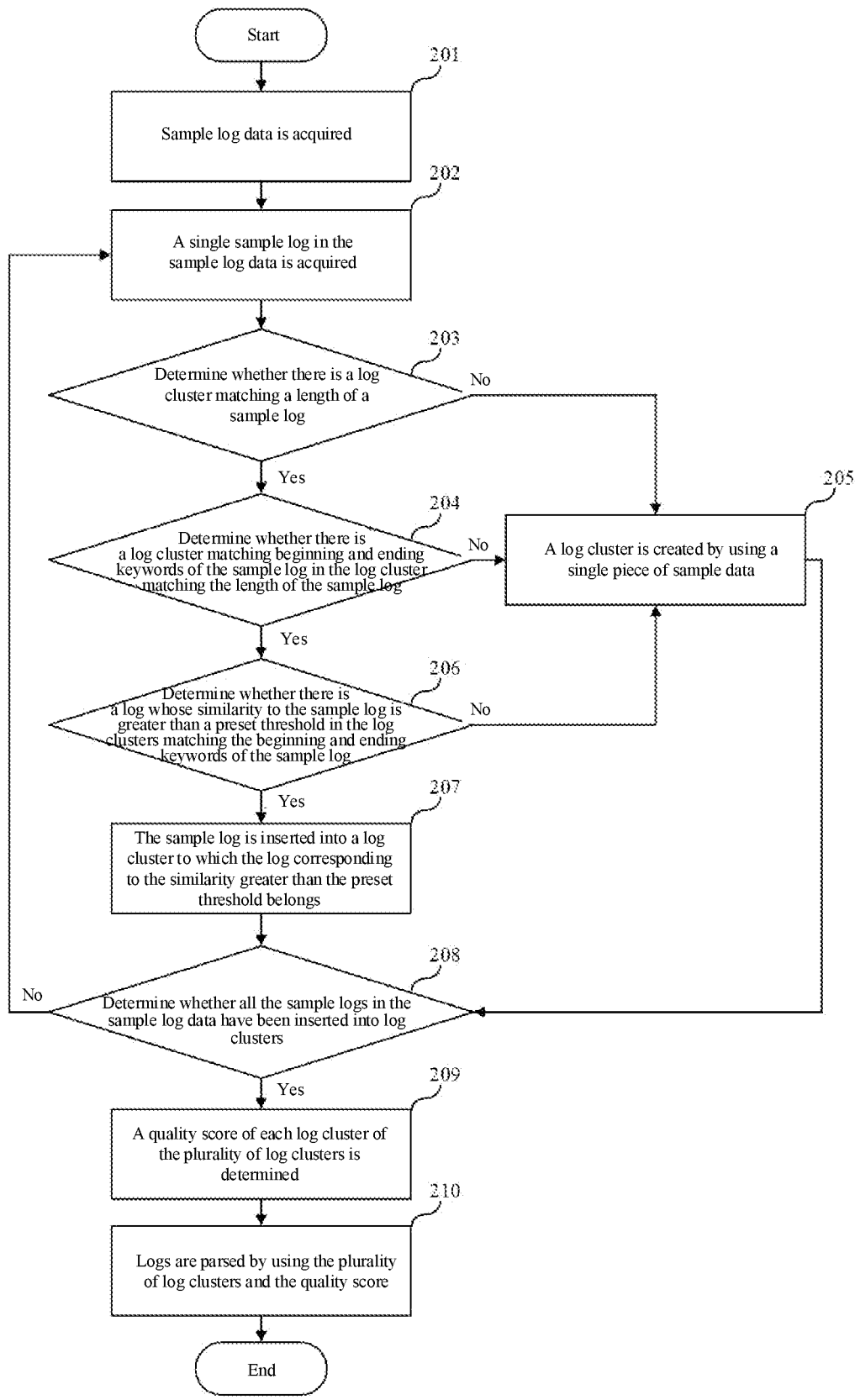
FIG. 2 is a flowchart of a log parsing method according to a second embodiment of the present disclosure.
Figure 3:
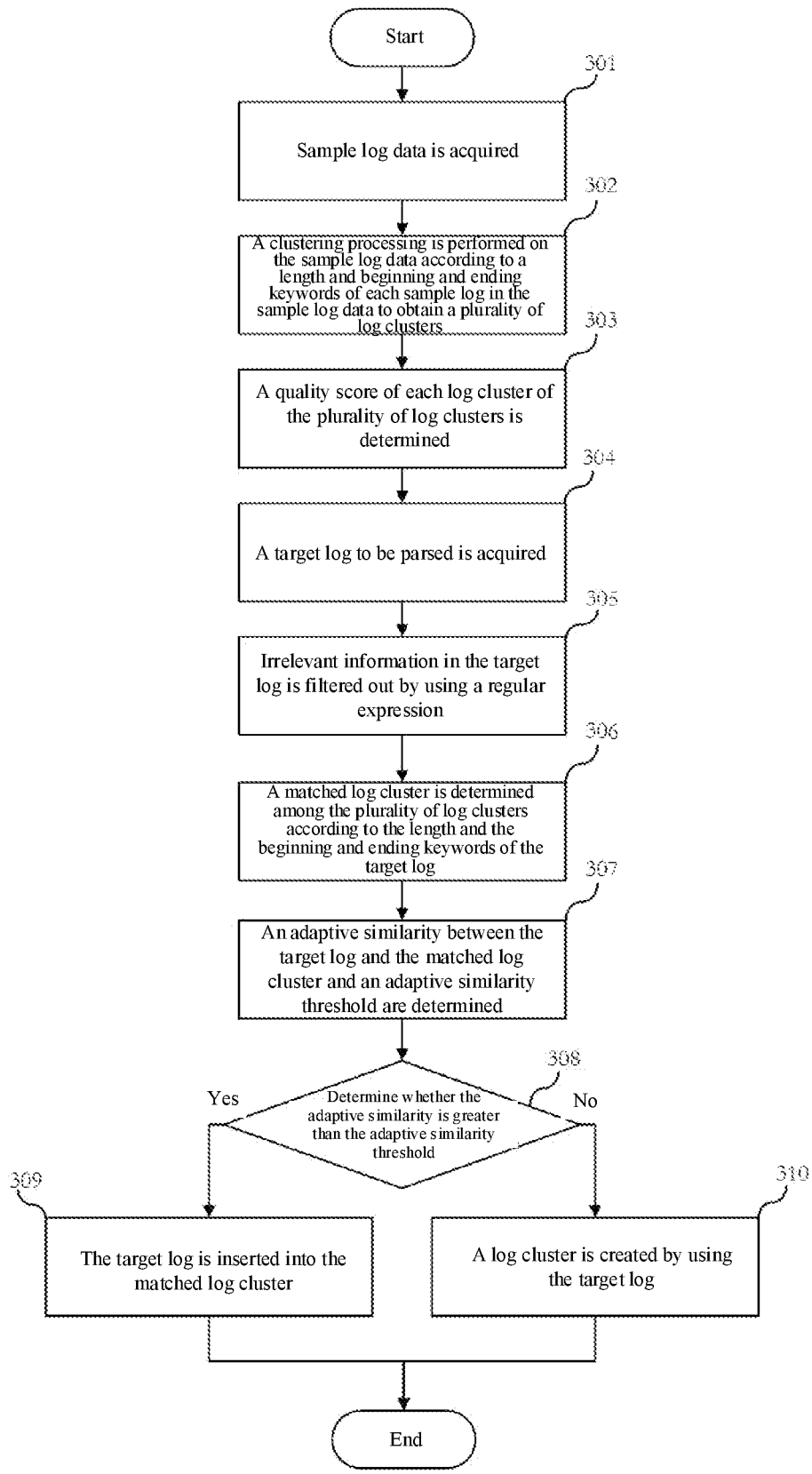
FIG. 3 is a flowchart of a log parsing method according to a third embodiment of the present disclosure.
Figure 4:
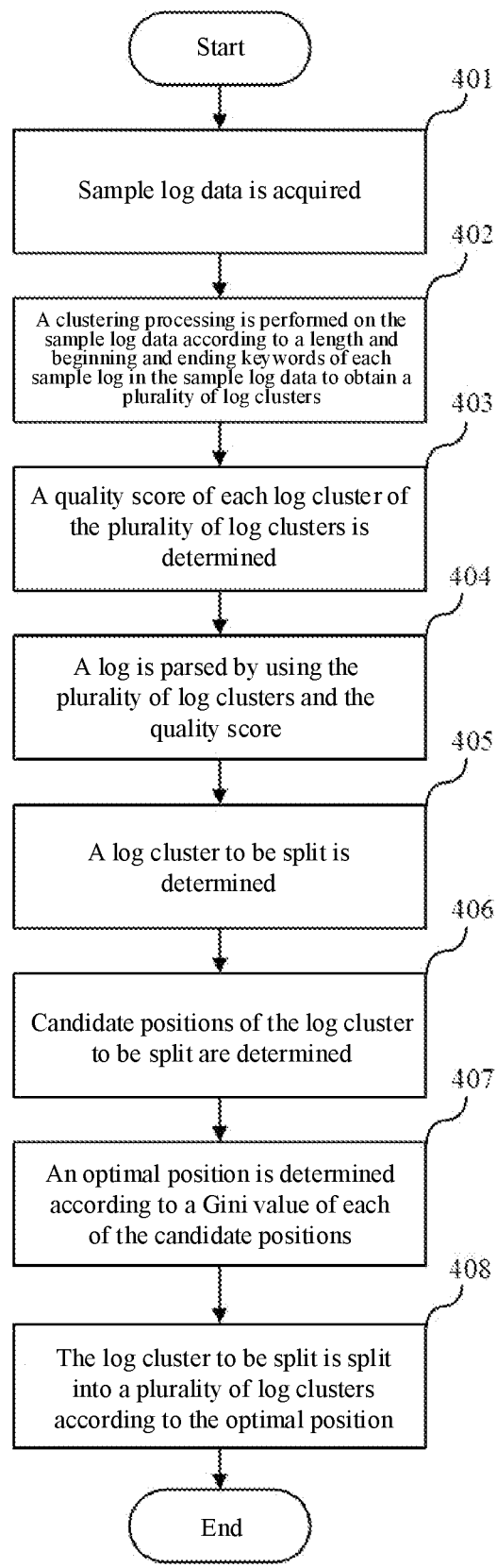
FIG. 4 is a flowchart of a log parsing method according to a fourth embodiment of the present disclosure.
Figure 5:
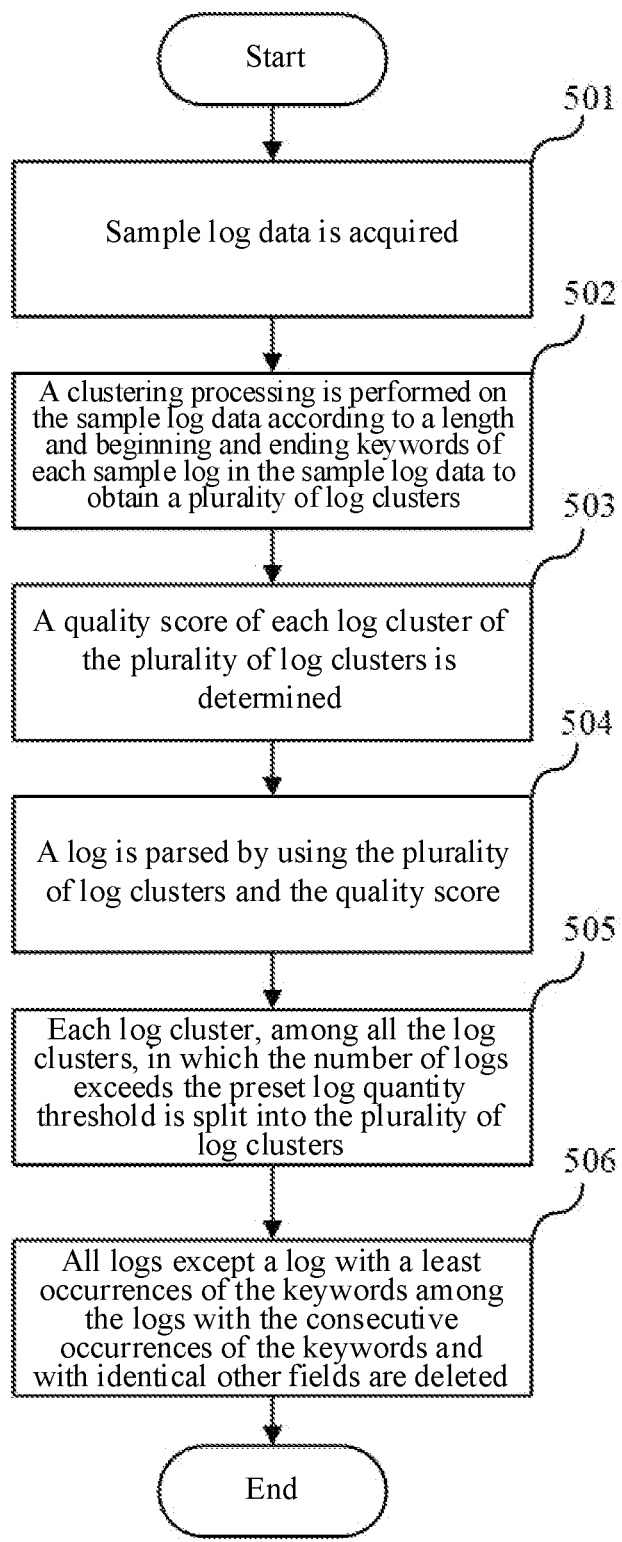
FIG. 5 is a flowchart of a log parsing method according to a fifth embodiment of the present disclosure.

The embodiments of the present disclosure will be described in detail below with reference to the accompanying drawings in order to make the objectives, technical solutions and advantages of the present disclosure clearer. However, it will be apparent to those skilled in the art that, in the various embodiments of the present disclosure, numerous technical details are set forth in order to provide the reader with a better understanding of the present disclosure. However, the technical solutions claimed in the present disclosure may be implemented without these technical details and various changes and modifications based on the following embodiments. The following embodiments are divided for convenience of description, and should not constitute any limitation to the specific implementation of the present disclosure. The various embodiments may be combined with each other and referred to each other on the premise of no contradiction.

A first embodiment of the present disclosure relates to a log parsing method. In this embodiment, sample log data is acquired. A clustering processing is performed on the sample log data according to a length of each sample log in the sample log data, and beginning and ending keywords of each sample log in the sample log data, to obtain a plurality of log clusters. A quality score of each log cluster of the plurality of log clusters is determined. A log is parsed by using the plurality of log clusters and the quality scores of the plurality of log clusters. Herein, parsing the log includes determining an adaptive similarity threshold for the log using the quality scores of the plurality of log clusters.

The implementation details of the log parsing method in this embodiment will be described in detail below. The following contents are only provided for the convenience of understanding, and are not necessary for the implementation of this solution.

As shown in flowchart 1, the log parsing method in this embodiment may specifically include the following operations.

In operation 101, the sample log data is acquired.

Specifically, the sample log data is acquired. The acquired sample log data includes a plurality of sample logs, where irrelevant information is filtered out from the sample logs by a regular expression.

In operation 102, the clustering processing is performed on the sample log data according to the length of each sample log in the sample log data, and the beginning and ending keywords of each sample log, to obtain the plurality of log clusters.

Specifically, the lengths and the beginning and ending keywords of the sample logs are set as classification conditions, and the clustering processing is performed on the sample log data, thereby the plurality of log clusters are obtained by clustering. An log cluster is a special data structure, which is configured to store a set of log signatures, a row index list (configured to store log ID numbers belonging to this log cluster, herein the lengths and the beginning and ending keywords of the logs are used as row indexes), a number of constant fields of each log signature, and a similarity threshold used for classifying logs into this log cluster.

Specifically, after the plurality of log clusters are obtained, caching processing is performed on the plurality of log clusters by using the lengths and the beginning and ending keywords of the logs in the log clusters as keys, and using the logs in the log cluster as values.

In operation 103, the quality score of each log cluster of the plurality of log clusters is determined.

Specifically, parsing the log includes determining an adaptive similarity threshold for the log using the quality scores of the plurality of log clusters. Determining the quality score of each log cluster of the plurality of log clusters includes: calculating a compactness of each log cluster of all the log clusters and a separation between different log clusters, and taking a normalized product of the compactness and the separation as the quality score of each log cluster of the plurality of log clusters.

Further, the compactness refers to a ratio of a constant to a total length in the log signature. The compactness is defined as g, and its calculation formula is:

$$g(r) = \frac{ct_r}{l_r}$$

where $ct_r$ represents the number of constant fields in the log signature r, and $l_r$ represents the length of r.

The separation refers to a discrepancy between discrete item sets of different log signatures, where the discrete item sets include a plurality of discrete item pairs, and the discrete item pairs refer to all item pairs generated by every two fields, excluding wildcard characters, of the log. Generally, the separation is obtained by calculating a Jaccard distance between the discrete item pairs of different log clusters. The specific calculation formula of the Jaccard distance J is as follows:

$$J(A, B) = \frac{|A \cup B| - |A \cap B|}{|A \cup B|}$$

where A represents all field pairs generated by a log signature to be compared, and B represents all field pairs generated by an existing log signature.

In a specific example, a log signature "RAS KERNEL * generating core" in a log cluster includes a wildcard character *, then the compactness of the log cluster g=4/5, and the discrete term pairs of the log signature include (RAS, KERNEL), (RAS, generating), (RAS, core), (KERNEL, generating), (KERNEL, core) and (generating, core). The Jaccard distances of discrete item pairs corresponding to each log cluster are calculated to obtain the separation between this log cluster and other log clusters.

In operation 104, the log is parsed by using the plurality of log clusters and the quality scores of the plurality of log clusters.

Specifically, the logs to be parsed are input one by one in a streaming manner, and the input logs are analyzed and compared with the plurality of existing log clusters, and an adaptive similarity threshold for the input logs and the log clusters participating in the comparison is determined by using the quality score in the analysis process, so as to implement the parsing of the input logs.

Compared with the related technology, in this embodiment, the clustering processing is performed on the sample log data according to the length of each sample log in the sample log data, and the beginning and ending keywords of each sample log in the sample log data, and the quality score of each log cluster of the plurality of log clusters obtained by the clustering processing is determined, and then the log is parsed according to the plurality of log clusters and the quality score. By selecting the lengths and keywords of logs as the conditions for the clustering processing, the log parsing speed is greatly improved meanwhile the accuracy of log parsing is ensured. In addition, by performing the log parsing according to the plurality of log clusters obtained by clustering and the quality score while performing re-clustering by iterative updating, the accuracy of the log parsing is further improved, so as to improve the efficiency of the log parsing while ensuring the accuracy of the log parsing.

A second embodiment of the present disclosure relates to a log parsing method. The second embodiment is roughly the same as the first embodiment, with the main difference that the second embodiment of the present disclosure specifically provides a method of performing a clustering processing on sample log data according to a length of each sample log in the sample log data, and beginning and ending keywords of each sample log in the sample log data, to obtain a plurality of log clusters.

As shown in flowchart 2, the log parsing method in this embodiment may specifically include the following operations.

In operation 201, the sample log data is acquired. This operation is similar to operation 101 in the first embodiment, and is not repeated here.

In operation 202, a single sample log in the sample log data is acquired.

In operation 203, it is determined whether there is a log cluster matching a length of a sample log. In response to there being the log cluster matching the length of the sample log, go to operation 204; or in response to there not being the log cluster matching the length of the sample log, go to operation 205.

Specifically, a plurality of log clusters, among the existing log clusters, with a log length identical to that of the sample log are determined. In response to there not being the log cluster matching the length of the sample log, a log cluster is created by using the sample log.

In a specific example, the sample log is "RAS KERNEL INFO generating core". At this time, a plurality of log clusters with "length=5" are determined.

In operation 204, it is determined whether there is a log cluster matching the beginning and ending keywords of the sample log in the log cluster matching the length of the sample log. In response to there being the log cluster matching the beginning and ending keywords of the sample log in the log cluster matching the length of the sample log, go to operation 206, or in response to there not being the log cluster matching the beginning and ending keywords of the sample log in the log cluster matching the length of the sample log, go to operation 205.

Specifically, whether the beginning and ending keywords of the sample log include any special characters is analyzed first. In response to any special characters such as "_" being included, the keyword in this position is replaced by a wildcard character "*". In response to any special characters not being included, the keywords are taken as a determination condition. Among the determined log clusters that match the log length of the sample log, a plurality of log clusters matching the beginning and ending keywords of the sample log are determined. In response to there not being the log cluster matching the beginning and ending keywords of the sample log, a log cluster is created by using the sample log.

In a specific example, the sample log is "RAS KERNEL INFO generating core". At this time, among the log clusters with "length=5", a plurality of log clusters with beginning and ending keywords of log signatures being "RAS" and "core" are determined.

In operation 205, a log cluster is created by using a single piece of sample data.

In operation 206, it is determined whether there is a log whose similarity to the sample log is greater than a preset threshold in the log clusters matching the beginning and ending keywords of the sample log. In response to there being the log whose similarity to the sample log is greater than the preset threshold, go to operation 207; or in response to there not being the log whose similarity to the sample log is greater than the preset threshold, go to operation 205.

In operation 207, the sample log is inserted into a log cluster to which the log corresponding to the similarity greater than the preset threshold belongs.

Specifically, the similarity between the sample log and the existing logs in the log cluster is determined, and it is determined whether the similarity exceeds a specified threshold. The sample log is compared with all logs in the log cluster in turn, in response to the similarity between the sample log and a compared log being greater than the threshold, the sample log is classified into a cluster with a highest similarity among all matched log clusters. In response to the similarity between the sample log and any log being lower than the specified threshold, a new log cluster is created by using the sample log.

Further, the similarity sim may be determined by the following calculation formula:

$$sim(seq, tem) = \frac{\sum_{i=1}^{l} \text{cost}(seq_i, tem_i)}{n_c}$$

where seq represents the sample log, tem represents a compared log in the log cluster, and $\text{cost}(seq_i, tem_i)$ represents an Exclusive NOR operation, that is, in response to $seq_i$ and $tem_i$ being the same, the value of the cost is 1; and in response to $seq_i$ being different from $tem_i$, the value of the cost is 0, where $seq_i$ represents an ith field of seq, and $tem_i$ represents an ith field of tem, l represents the log length of the sample log, and $n_c$ represents the number of constant fields of the currently compared log in the log cluster.

Further, the preset threshold t may be determined by the following calculation formula:

$$t = 1 - \frac{\text{float}(diff)}{n_c}$$

where diff represents the different count values in each position of the sample log and the compared logs in the log cluster, float represents a forced conversion of a variable data type to a floating point type, $n_c$ represents the number of constant fields of the currently compared log in the log cluster.

In a specific example, the sample log is "RAS KERNEL INFO generating core", and there is already a log "RAS KERNEL * generating core" in the log cluster, then the similarity is $$\frac{4}{5},$$

and the similarity threshold is $$1 - \frac{1}{5} = \frac{4}{5},$$

then the sample log is inserted into the log cluster.

In operation 208, it is determined whether all the sample logs in the sample log data have been inserted into log clusters. In response to all the sample logs in the sample log data being inserted into the log clusters, go to operation 209, or in response to not all the sample logs in the sample log data being inserted into the log clusters, go to operation 202.

In operation 209, a quality score of each log cluster of the plurality of log clusters is determined.

In operation 210, the logs are parsed by using the plurality of log clusters and the quality scores of the plurality of log clusters.

Operations 209 and 210 in this embodiment are similar to operations 103 and 104 in the first embodiment, and are not repeated here.

Compared with the related technology, in this embodiment, the clustering processing is performed on the sample log data according to the length of each sample log in the sample log data, and the beginning and ending keywords of each sample log in the sample log data, and the quality score of each log cluster of the plurality of log clusters obtained by the clustering processing is determined, and then the log is parsed according to the plurality of log clusters and the quality score. By selecting the lengths and keywords of logs as the conditions for the clustering processing, the log parsing speed is greatly improved meanwhile the accuracy of log parsing is ensured.

A third embodiment of the present disclosure relates to a log parsing method. In this embodiment, the process of parsing the log by using the plurality of log clusters and the quality scores of the plurality of log clusters is further refined: acquiring a target log to be parsed; filtering out irrelevant information in the target log by using a regular expression; determining a matched log cluster among the plurality of log clusters according to a length and beginning and ending keywords of the target log, and determining an adaptive similarity between the target log and the matched log cluster; determining an adaptive similarity threshold for the target log and the matched log cluster according to a quality score of the matched log cluster; and determining whether the adaptive similarity is greater than the adaptive similarity threshold; in response to the adaptive similarity being greater than the adaptive similarity threshold, inserting the target log into the matched log cluster; in response to the adaptive similarity not being greater than the adaptive similarity threshold, creating a log cluster by using the target log.

As shown in flowchart 3, the log parsing method in this embodiment may specifically include the following operations.

In operation 301, sample log data is acquired.

In operation 302, a clustering processing is performed on the sample log data according to a length of each sample log in the sample log data, and the beginning and ending keywords of each sample log in the sample log data, to obtain a plurality of log clusters.

In operation 303, a quality score of each log cluster of the plurality of log clusters is determined.

Operations 301 to 303 in this embodiment are similar to operations 101 to 103 in the first embodiment, and are not repeated here.

In operation 304, the target log to be parsed is acquired.

In operation 305, the irrelevant information in the target log is filtered out by using the regular expression.

Specifically, this operation mainly includes the following two aspects. The first aspect mainly involves the processing of position-independent items. In an original log, there are usually some fixed items, and these items occur in the same positions in the logs from a same source, for example, a first field in a log is usually a timestamp of log generation. Or, although these items change, their attributes are the same. For example, request ID may be generated in a fixed position in nova data. Meaningless data in these fixed positions may be filtered by parsing the log characteristics. For example, the records in the first column in this example all corresponds to an attribute of timestamp. The second aspect mainly involves the processing of related items in uncertain positions. There are also some items in the log text. These items have the same attribute, but their positions are not fixed, and they are an important part of the log and must not be deleted at will. Although the formats of the log texts generated by different systems are not the same, some fields in the log likewise follow the "international conventions", such as an IP address, a file directory structure, etc. Therefore, acquiring sample log data that is pre-processed, i.e., by using the preset regular expression method, can greatly reduce the cost of parsing the logs.

In a specific example, an original log to be parsed is "2017-10-07 12:00: 13 RAS KERNEL INFO generating core", and a processed log is "RAS KERNEL INFO generating core", that is, after filtering out irrelevant information in the target log by using a regular expression, the log to be parsed becomes to "RAS KERNEL INFO generating core".

In operation 306, a matched log cluster is determined among the plurality of log clusters according to the length and the beginning and ending keywords of the target log.

Specifically, the length and the beginning and ending keywords of the log to be parsed are directly used as keys, and a log cluster whose log length and beginning and ending keywords match the log to be parsed is acquired from the plurality of log clusters by querying cache.

In operation 307, the adaptive similarity between the target log and the matched log cluster and the adaptive similarity threshold are determined.

Specifically, the calculation method of the adaptive similarity is the same as the similarity calculation method in the second embodiment of the present disclosure. The adaptive similarity threshold is obtained by multiplying the similarity threshold in the second embodiment of the present disclosure with the quality score.

Further, the adaptive similarity sim may be determined by the following calculation formula:

$$sim(seq, tem) = \frac{\sum_{i=1}^{l} \text{cost}(seq_i, tem_i)}{n_c}$$

where seq represents the log to be parsed, tem represents a log in the matched log cluster, and $\text{cost}(seq_i, tem_i)$ represents an Exclusive NOR operation, that is, in response to $seq_i$ and $tem_i$ being the same, the value of the cost is 1; or in response to $seq_i$ being different from $tem_i$, the value of the cost is 0, where $seq_i$ represents an ith field of seq, and $tem_i$ represents an ith field of tem, l represents the log length of the log to be parsed, and $n_c$ represents the number of constant fields of the matched and compared logs in the log cluster.

Further, the adaptive similarity threshold t' may be determined by the following calculation formula:

$$t' = \left(1 - \frac{\text{float}(\textit{diff})}{n_c}\right) * q$$

where diff represents the different count values in each position of the log to be parsed and the log in the matched log cluster, float( ) represents a forced conversion of a variable data type to a floating point type, $n_c$ represents the number of constant fields of the currently compared log in the log cluster, and q represents the quality score of the matched log cluster.

In operation 308, it is determined whether the adaptive similarity is greater than the adaptive similarity threshold. In response to the adaptive similarity being greater than the adaptive similarity threshold, go to operation 309; or in response to the adaptive similarity not being greater than the adaptive similarity threshold, go to operation 310.

In operation 309, the target log is inserted into the matched log cluster.

In a specific example, the log to be parsed is "RAS KERNEL INFO generating core", and there is a log "RAS KERNEL * generating core" in the log cluster, then the adaptive similarity is and the adaptive similarity threshold is $$\left(1-\left(1-\frac{1}{5}\right)\right)*q = \frac{4}{5}q,$$

where q<1. That is, the adaptive similarity is greater than the adaptive similarity threshold, then the log to be parsed is inserted into the log cluster.

In operation 310, a log cluster is created by using the target log.

In a specific example, parsing the log using the plurality of log clusters and the quality score includes: acquiring an overall data set, and processing the target logs in turn. A current original log to be parsed is "2017-10-07 12:00:13 Delete block blk_2342", and an existing log cluster is "Delete block *". After filtering by the regular expression, the log to be parsed becomes to "Delete block blk_2342". According to the length of "length=3" and the beginning and ending keywords of "Delete" and "*" ("blk_2342" includes a special character "_", which is replaced by "*") of the log, the log cluster "Delete block *" is determined as the matched log cluster, and the adaptive similarity between the log and the logs in the log cluster is determined. The adaptive similarity is $$\frac{2}{3},$$

and the adaptive similarity threshold is $$\frac{2}{3}q,$$

where q<1, so that the log can be directly inserted into the log cluster.

It is noted that while parsing the target log, the acquired plurality of log clusters may also be iteratively re-clustered and the quality score of each log cluster may be recalculated. The log clusters are continuously updated according to the real-time process of log parsing, thereby the accuracy of the log parsing can be further improved in the parsing process.

Compared with the related technology, in this embodiment, the sample log data is acquired; the clustering processing is performed on the sample log data according to the length of each sample log in the sample log data, and the beginning and ending keywords of each sample log in the sample log data, to obtain the plurality of log clusters; the quality score of each log cluster of the plurality of log clusters is determined; and the log is parsed by using the plurality of log clusters and the quality scores of the plurality of log clusters. Herein, parsing the log by using the plurality of log clusters and the quality scores of the plurality of log clusters includes: acquiring the target log to be parsed; filtering out the irrelevant information in the target log by using the regular expression; determining the matched log cluster among the plurality of log clusters according to the length and the beginning and ending keywords of the target log, and determining the adaptive similarity between the target log and the matched log cluster; determining the adaptive similarity threshold for the target log and the matched log cluster according to a quality score of the matched log cluster; and determining whether the adaptive similarity is greater than the adaptive similarity threshold; in response to the adaptive similarity being greater than the adaptive similarity threshold, inserting the target log into the matched log cluster; in response to the adaptive similarity not being greater than the adaptive similarity threshold, creating a log cluster by using the target log. Several log clusters with the highest similarity to the log to be parsed are quickly determined by the log length and the beginning and ending keywords, and then a log cluster that best matches the log to be parsed is determined according to the quality score of each cluster. At the same time, the re-clustering is performed by iterative updating and the log score of each cluster is recalculated. In this way, the speed of the log parsing can be greatly improved while the accuracy of the log parsing can be ensured.

A fourth embodiment of the present disclosure relates to a log parsing method. This embodiment is a further improvement on the basis of the first embodiment: after parsing the log by using the plurality of log clusters and the quality scores of the plurality of log clusters, the method further includes: splitting a log cluster meeting a preset splitting condition; where the splitting condition includes that a number of logs in the log cluster exceeds a preset log quantity threshold.

As shown in flowchart 4, the log parsing method in this embodiment may specifically include the following operations.

In operation 401, sample log data is acquired.

In operation 402, a clustering processing is performed on the sample log data according to a length of each sample log in the sample log data, and the beginning and ending keywords of each sample log in the sample log data, to obtain a plurality of log clusters.

In operation 403, a quality score of each log cluster of the plurality of log clusters is determined.

In operation 404, a log is parsed by using a plurality of log clusters and the quality score.

Operations 401 to 404 in this embodiment are similar to operations 101 to 104 in the first embodiment, and are not repeated here.

In operation 405, a log cluster to be split is determined.

Specifically, each log cluster, among all the log clusters, in which the number of logs exceeds the preset log quantity threshold is split into a plurality of log clusters. In response to the number of logs in a log cluster being less than the preset log quantity threshold, that is, the number of logs in the currently parsed log cluster is too small, and information stored by the parameters in each position of the logs in the log cluster is limited, the log cluster is not split temporarily. In response to the number of logs in a log cluster being greater than the preset log quantity threshold, that is, the number of logs in the currently parsed log cluster is large, and the speed of the log parsing may be affected. The preset log quantity threshold may be set by technicians according to the actual situation.

In operation 406, candidate positions of the log cluster to be split are determined.

Specifically, positions, in each of the log clusters to be split, in which the number of fields is less than a preset field quantity threshold and greater than 1 are determined as the candidate positions. In response to the number of fields in a position in the log exceeding the preset field quantity threshold, it means that there are many kinds of parameters in this position, and indicates that the possibility that parameters are in this position is higher to a certain extent. In this case, the log cluster is not split according to this position, and the field quantity threshold may be set by technicians according to the actual situation.

In operation 407, an optimal position is determined according to a Gini value of each of the candidate positions.

Specifically, the Gini values (Gini value is an index for selecting optimal features when a classification and regression tree (CART) is used for classification problems) of all the candidate positions are calculated, and the Gini value of each of the candidate positions is compared with a maximum Gini value of the log parameter. The optimal position with the maximum Gini value is selected among the candidate positions whose comparison result is less than the maximum Gini value of the log parameter. The Gini value gini of each position may be determined by the following calculation formula:

$$gini = 1 - \frac{\sum_{i=1}^{l} N_i^2}{cnt^2}$$

where l represents the total number of unique fields occurring in the current position obtained by counting in the current position, $N_i^2$ represents the number of occurrences of the corresponding unique fields, and cnt represents the total number of fields occurring in this position.

Specifically, only in response to an entropy value of a parameter in a position in a log exceeding a minimum entropy value of the log parameters, this position is used as a candidate position for splitting, so the maximum Gini value of the log parameters is introduced. In response to the Gini value of a candidate position being less than the maximum Gini value of the log parameters, it is satisfied that the entropy value of the log parameter is greater than the minimum entropy value of the log parameters. The maximum Gini value of the log parameters may be set by technicians according to the actual situation.

In operation 408, the log cluster to be split is split into a plurality of log clusters according to the optimal position.

Specifically, different fields in the optimal position are allocated to different log clusters, and fields in other positions remain unchanged, in this way, the log cluster to be split is split into the plurality of log clusters.

In a specific example, assuming that a given log cluster includes "RAS KERNEL INFO generating core" and "RAS KERNEL FAILED generating core", it is firstly determined whether the number of logs in the log cluster exceeds a preset log quantity threshold template. In response to not exceeding the log quantity threshold template, a splitting of the log cluster is skipped. In response to exceeding the log quantity threshold template (for example, there are 100 logs in the log cluster and the threshold is set to 50), the number of fields in each position of the log signature of the log cluster is determined. In this example, there is only one field RAS in position 1, only one field KERNEL in position 2, and two different fields INFO and FAILED in position 3. The processing for the position with only one field is skipped. Those positions in which the number of fields is less than the preset field quantity threshold are taken as candidate positions (here, the position 2 and the position 3 are selected as the candidate positions). The Gini value of each candidate position is calculated and compared with the maximum Gini value of the log parameters. A position with the largest Gini value is selected from the candidate positions as the optimal position, and the fields in the optimal position are split. For example, the log cluster is split according to the fields INFO and FAILED in the position 3, then the corresponding log clusters "RAS KERNEL INFO generating core" and "RAS KERNEL FAILED generating core" are obtained after splitting.

Compared with the related technology, in this embodiment, the sample log data is acquired; the clustering processing is performed on the sample log data according to the length of each sample log in the sample log data, and the beginning and ending keywords of each sample log in the sample log data, to obtain the plurality of log clusters; the quality score of each log cluster in the plurality of log clusters is determined; and the log is parsed by using the plurality of log clusters and the quality scores of the plurality of log clusters. The log cluster meeting the preset splitting condition is split, where the splitting condition includes that the number of logs in the log cluster exceeds the preset log quantity threshold. By splitting the log clusters in which the number of logs exceeds the threshold, the quality score of each log cluster can be improved, and the parsing speed can be prevented from slowing down due to the excessive number of logs in the log cluster, which is also an update and optimization of all log clusters.

A fifth embodiment of the present disclosure relates to a log parsing method. This embodiment is a further improvement on the basis of the fourth embodiment. After each log cluster, among all the log clusters, in which the number of logs exceeds the preset log quantity threshold is split into a plurality of log clusters, the method further includes: searching for logs with consecutive occurrences of keywords and with identical other fields in each log cluster obtained by splitting, and taking searched logs as candidate logs to be deleted; and deleting all logs except a log with a least occurrences of the keywords of the candidate logs to be deleted.

As shown in flowchart 5, the log parsing method in this embodiment may specifically include the following operations.

In operation 501, sample log data is acquired.

In operation 502, a clustering processing is performed on the sample log data according to a length of each sample log in the sample log data, and the beginning and ending keywords of each sample log in the sample log data, to obtain a plurality of log clusters.

In operation 503, a quality score of each log cluster of the plurality of log clusters is determined.

In operation 504, a log is parsed by using a plurality of log clusters and the quality score.

Operations 501 to 504 in this embodiment are similar to operations 101 to 104 in the first embodiment, and are not repeated here.

In operation 505, each log cluster, among all the log clusters, in which the number of logs exceeds the preset log quantity threshold is split into the plurality of log clusters.

In operation 506, all logs except a log with a least occurrences of the keywords among the logs with the consecutive occurrences of the keywords and with identical other fields are deleted.

Specifically, this operation is mainly aimed to the situation that logs with the same information have different lengths, and this operation mainly includes the following two situations.

(1) Consecutive and identical pre-processed variables are combined into one pre-processed variable, such as standardizing "delete block blk object blk object" and "delete block blk object blk object blk object" into "delete block blk object";

(2) Consecutive parameter wildcard characters are combined into one parameter wildcard character, such as standardizing "A B * * C" and "A B * * * C" into "A B * C".

Compared with the related technology, in this embodiment, the sample log data is acquired; the clustering processing is performed on the sample log data according to the length of each sample log in the sample log data, and the beginning and ending keywords of each sample log in the sample log data, to obtain the plurality of log clusters; the quality score of each log cluster of the plurality of log clusters is determined; the log is parsed by using the plurality of log clusters and the quality scores of the plurality of log clusters; each log cluster, among all the log clusters, in which the number of logs exceeds the preset log quantity threshold is split into the plurality of log clusters. The logs with the consecutive occurrences of keywords and with identical other fields in each log cluster obtained by splitting are searching for, and searched logs are taken as the candidate logs to be deleted; all logs except the log with the least occurrences of the keywords of the candidate logs to be deleted are deleted. By deleting repetitive logs of the logs with the consecutive occurrences of keywords and with identical other fields, the log parsing speed can be improved.

The operations set in the above-described methods only aim to make the description clearer. In implementation, the operations may be combined into one or one operation may be divided into multiple operations, which all fall into the protection scope of the present disclosure as long as the same logical relationship is included. Such a trivial amendment or design added to an algorithm or procedure as not changing the algorithm or a central design of the procedure falls into the protection scope of the disclosure.

Figure 6:
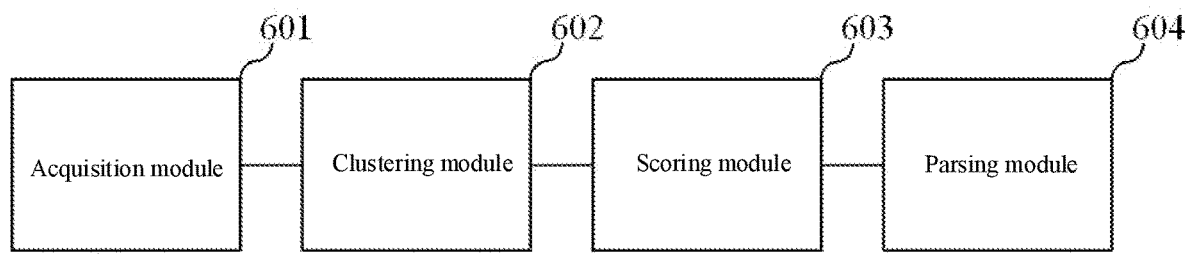
FIG. 6 is a structural block diagram of a log parsing device according to a sixth embodiment of the present disclosure.

A sixth embodiment of the present disclosure relates to a log parsing device, which includes an acquisition module 601, a clustering module 602, a scoring module 603 and a parsing module 604. The specific structure is shown in FIG. 6.

The acquisition module 601 is configured to acquire sample log data.

The clustering module 602 is configured to perform a clustering processing on the sample log data according to a length of each sample log in the sample log data, and beginning and ending keywords of each sample log in the sample log data, to obtain a plurality of log clusters.

The scoring module 603 is configured to determine a quality score of each log cluster of the plurality of log clusters.

The parsing module 604 is configured to parse a log by using the plurality of log clusters and the quality scores of the plurality of log clusters.

In a specific example, performing the clustering processing on the sample log data according to the length of each sample log in the sample log data, and the beginning and ending keywords of the each sample log in the sample log data includes processing the each sample log in the sample log data as follows: determining whether there is a log cluster matching a length of a sample log; in response to there being the log cluster matching the length of the sample log, acquiring the log cluster matching the length of the sample log, or in response to there not being the log cluster matching the length of the sample log, creating a log cluster by using the sample log; determining whether there is a log cluster matching the beginning and ending keywords of the sample log in the log cluster matching the length of the sample log; in response to there being the log cluster matching the beginning and ending keywords of the sample log in the log cluster matching the length of the sample log, acquiring the log cluster matching the beginning and ending keywords of the sample log, and in response to there not being the log cluster matching the beginning and ending keywords of the sample log in the log cluster matching the length of the sample log, creating a log cluster by using the sample log; and determining similarities between all log signatures in the log cluster matching the beginning and ending keywords of the sample log and the sample log; in response to any similarity among all the similarities being greater than a preset threshold, inserting the sample log into a log cluster to which a log corresponding to the similarity greater than the preset threshold belongs; or in response to any similarity among all the similarities not being greater than the preset threshold, creating a log cluster by using the sample log.

In a specific example, determining the quality score of the each log cluster of the plurality of log clusters includes: determining the quality score of the each log cluster according to a compactness of each log cluster of all log clusters and a separation between different log clusters.

In a specific example, parsing the log by using the plurality of log clusters and the quality scores of the plurality of log clusters includes: acquiring a target log to be parsed; filtering out irrelevant information in the target log by using a regular expression; determining a matched log cluster among the plurality of log clusters according to a length and beginning and ending keywords of the target log, and determining an adaptive similarity between the target log and the matched log cluster; determining an adaptive similarity threshold for the target log and the matched log cluster according to a quality score of the matched log cluster; and determining whether the adaptive similarity is greater than the adaptive similarity threshold; in response to the adaptive similarity being greater than the adaptive similarity threshold, inserting the target log into the matched log cluster; in response to the adaptive similarity not being greater than the adaptive similarity threshold, creating a log cluster by using the target log.

In a specific example, after parsing the log by using the plurality of log clusters and the quality scores of the plurality of log clusters, further includes: splitting a log cluster meeting a preset splitting condition; where the splitting condition includes that a number of logs in the log cluster exceeds a preset log quantity threshold.

In a specific example, splitting the log cluster meeting the preset splitting condition includes: determining a position in the log cluster to be split where a number of fields is less than a preset field quantity threshold as a candidate position; and calculating Gini values of all candidate positions, and splitting the log cluster according to a candidate position corresponding to a maximum Gini value in the log cluster to be split.

In a specific example, after splitting the log cluster meeting the preset splitting condition, further includes: searching for logs with consecutive occurrences of keywords and with identical other fields in each log cluster obtained by splitting, and taking searched logs as candidate logs to be deleted; and deleting all logs except a log with a least occurrences of the keywords of the candidate logs to be deleted.

It is not difficult to find that this embodiment is an embodiment involving a device corresponding to the first embodiment, and this embodiment may be implemented in cooperation with the first embodiment. The relevant technical details mentioned in the first embodiment are still practicable in this embodiment, and in order to reduce repetition, they are not repeated here. Correspondingly, the relevant technical details mentioned in this embodiment may also be applied in the first embodiment.

It is noted that all the modules involved in this embodiment are logic modules. In practical applications, a logic unit may be a physical unit, a part of a physical unit, or a combination of multiple physical units. In addition, in order to highlight the innovative part of the present disclosure, this embodiment does not introduce a unit that is not closely related to solving the technical problems raised in the present disclosure, which does not denote that there are no other units in this embodiment.

Figure 7:
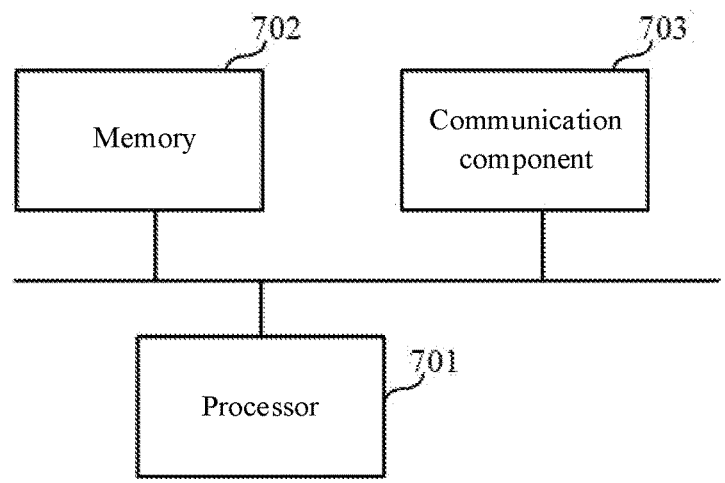
FIG. 7 is a structural block diagram of a server according to a seventh embodiment of the present disclosure.

A seventh embodiment of the present disclosure relates to a server. As shown in FIG. 7, the server includes at least one processor 701; and a memory 702 communicatively connected with the at least one processor 701; and a communication component 703 communicatively connected with the log parsing device. The communication component 703 receives and sends data under the control of the processor 701. Herein, the memory 702 stores instructions executable by the at least one processor 701, and the instructions are executed by the at least one processor 701 to implement the above-described log parsing method embodiments.

Specifically, the electronic device includes one or more processors 701 and the memory 702, and one processor 701 is taken as an example in FIG. 7. The processor 701 and the memory 702 may be connected by a bus or in other ways, and the connection by the bus is taken as an example in FIG. 7. The memory 702, as a computer-readable storage medium, may be configured to store computer software programs, computer-executable programs and modules. The processor 701 executes various functional applications and data processing of the device, that is, implements the above-described log parsing method, by running the computer software programs, instructions and modules stored in the memory 702.

The memory 702 may include a program storage area and a data storage area. The program storage area may store an operating system, an application required for at least one function, and the data storage area may store a list of options, etc. In addition, the memory 702 may include a high-speed random access memory, and may further include a non-transitory memory, such as at least one magnetic disk storage device, flash memory device, or other non-transitory solid state memory device. In some embodiments, the memory 702 may optionally include the memories that are set remotely relative to the processor 701, and these remote memories may be connected to an external device via a network. Examples of the above network include, but are not limited to, the Internet, an intranet, a local area network, a mobile communication network and combinations thereof.

One or more modules are stored in the memory 702. The one or more modules, when executed by the one or more processors 701, implement the log parsing method in any one of the above method embodiments.

The above products may perform the methods provided in the embodiments of the present disclosure, and have corresponding functional modules for performing the methods and beneficial effects. For the technical details not described in detail in the embodiments, reference may be made to the method provided in the embodiments of the present disclosure.

Herein, the memory and the processor are connected by a bus. The bus may include any number of interconnected buses and bridges, and the bus connects various circuits of one or more processors and the memory. The bus may also connect various other circuits such as a peripheral device, a voltage regulator, a power management circuit, etc., which are well known in the art, and therefore will not be further described herein. A bus interface provides an interface between the bus and a transceiver. The transceiver may be one element or multiple elements, such as multiple receivers and transmitters, providing a unit for communicating with various other devices over a transmission medium. The data processed by the processor is transmitted over a wireless medium via an antenna. In this embodiment, the antenna also receives the data and transmits the data to the processor.

The processor is responsible for managing the bus and general processing, and may further provide various functions of, for example, timing, peripheral interface, voltage regulation, power management, and other control functions. The memory may be configured to store the data used by the processor when performing operations.

An eighth embodiment of the present disclosure relates to a computer-readable storage medium storing a computer program. The compute program, when executed by a processor, implements the embodiments of the above-described log parsing method.

That is, those skilled in the art may understand that all or part of operations that realize the above-described embodiments may be performed by instructing related hardware through a program, the program may be stored in a storage medium and include several instructions to enable a device (which may be a single-chip microcomputer, a chip, or the like) or a processor to implement all or part of the operations of the method described in each embodiment of the present disclosure. The aforementioned storage media include: a U disk, a mobile hard disk, a read-only memory (ROM), a random access memory (RAM), a magnetic disk or an optical disk or other medium that may store program codes.

Those skilled in the art should appreciate that the aforementioned embodiments are specific embodiments for implementing the present disclosure. In practice, however, various changes may be made in the forms and details of the specific embodiments without departing from the spirit and scope of the present disclosure.

What is claimed is:

1. A method for parsing logs, the method being implemented in cooperation with a log parsing device, the log parsing device communicatively being connected with a communication component, the communication component receiving and sending data under the control of at least one processor, the at least one processor communicatively being connected with a memory, the memory storing instructions executable by the at least one processor; and the method comprising:

acquiring, by the at least one processor, sample log data, wherein the acquired sample log data includes a plurality of sample logs, and irrelevant information is filtered out from the plurality of sample logs by a regular expression;

performing, by the at least one processor, clustering processing on the acquired sample log data according to a length of each sample log in the acquired sample log data, and beginning and ending keywords of each sample log in the acquired sample log data, to obtain a plurality of log clusters;

determining, by the at least one processor, a quality score of each log cluster of the obtained plurality of log clusters, wherein determining the quality score of the each log cluster of the obtained plurality of log clusters comprises:

determining the quality score of the each log cluster according to a compactness of each log cluster of all log clusters and a separation between different log clusters, wherein the quality score is a normalized product of the compactness and the separation; and parsing, by the at least one processor, a log online by using the obtained plurality of log clusters and determined quality scores of the obtained plurality of log clusters so as to be used for construction of program workflow and anomaly detection in a system;

wherein parsing the log includes determining an adaptive similarity threshold for the log using quality scores of the obtained plurality of log clusters; and wherein parsing the log online by using the obtained plurality of log clusters and the determined quality scores of the obtained plurality of log clusters comprises:

acquiring a target log to be parsed;

filtering out irrelevant information in the target log by using the regular expression;

determining a matched log cluster among the obtained plurality of log clusters according to a length and beginning and ending keywords of the target log, and determining an adaptive similarity between the target log and the matched log cluster;

determining an adaptive similarity threshold for the target log and the matched log cluster according to a quality score of the matched log cluster; and determining whether the adaptive similarity is greater than the adaptive similarity threshold; in response to the adaptive similarity being greater than the adaptive similarity threshold, inserting the target log into the matched log cluster; in response to the adaptive similarity not being greater than the adaptive similarity threshold, creating a log cluster by using the target log; wherein determining the matched log cluster among the obtained plurality of log clusters according to the length and beginning and ending keywords of the target log comprises:

using the length and the beginning and ending keywords of the log to be parsed directly as keys;

acquiring a log cluster whose log length and beginning and ending keywords match the log to be parsed from the plurality of log clusters by querying cache.

2. The method according to claim 1, wherein performing the clustering processing on the acquired sample log data according to the length of each sample log in the acquired sample log data, and the beginning and ending keywords of the each sample log in the acquired sample log data comprises:

processing the each sample log in the acquired sample log data as follows:

determining whether there is a log cluster matching a length of a sample log; in response to there being the log cluster matching the length of the sample log, acquiring the log cluster matching the length of the sample log, or in response to there not being the log cluster matching the length of the sample log, creating a log cluster by using the sample log;

determining whether there is a log cluster matching the beginning and ending keywords of the sample log in the log cluster matching the length of the sample log; in response to there being the log cluster matching the beginning and ending keywords of the sample log in the log cluster matching the length of the sample log, acquiring the log cluster matching the beginning and ending keywords of the sample log, and in response to there not being the log cluster matching the beginning and ending keywords of the sample log in the log cluster matching the length of the sample log, creating a log cluster by using the sample log; and determining similarities between all log signatures in the log cluster matching the beginning and ending keywords of the sample log and the sample log; in response to any similarity among all the similarities being greater than a preset threshold, inserting the sample log into a log cluster to which a log corresponding to the similarity greater than the preset threshold belongs; or in response to any similarity among all the similarities not being greater than the preset threshold, creating a log cluster by using the sample log.

3. The method according to claim 1, wherein the compactness is defined as a ratio of a constant to a total length in the log, and the separation is defined as a discrepancy between discrete item sets of two different logs;

wherein, the discrete item set refers to a set of discrete item pairs, and the discrete item pairs refer to all item pairs generated by every two fields in each log.

4. The method according to claim 1, wherein after parsing the log by using the obtained plurality of log clusters and the determined quality scores of the obtained plurality of log clusters, the method further comprises:

splitting a log cluster meeting a preset splitting condition;

wherein, the splitting condition comprises that a number of logs in the log cluster exceeds a preset log quantity threshold.

5. The method according to claim 4, wherein splitting the log cluster meeting the preset splitting condition comprises:

determining a position in the log cluster to be split where a number of fields is less than a preset field quantity threshold as a candidate position; and calculating Gini values of all candidate positions, and splitting the log cluster according to a candidate position corresponding to a maximum Gini value in the log cluster to be split.

6. The method according to claim 4, wherein after splitting the log cluster meeting the preset splitting condition, the method further comprises:

searching for logs with consecutive occurrences of keywords and with identical other fields in each log cluster obtained by splitting, and taking searched logs as candidate logs to be deleted; and deleting all logs except a log with a least occurrences of the keywords of the candidate logs to be deleted.

7. A non-transitory computer-readable storage medium storing a computer program, wherein the computer program, when executed by a processor, implements the method according to claim 1.

8. The non-transitory computer-readable storage medium according to claim 7, wherein performing the clustering processing on the acquired sample log data according to the length and the beginning and ending keywords of the each sample log in the acquired sample log data comprises:

processing the each sample log in the acquired sample log data as follows:

determining whether there is a log cluster matching a length of a sample log; in response to there being the log cluster matching the length of the sample log, acquiring the log cluster matching the length of the sample log, or in response to there not being the log cluster matching the length of the sample log, creating a log cluster by using the sample log;

determining whether there is a log cluster matching the beginning and ending keywords of the sample log in the log cluster matching the length of the sample log; in response to there being the log cluster matching the beginning and ending keywords of the sample log in the log cluster matching the length of the sample log, acquiring the log cluster matching the beginning and ending keywords of the sample log, and in response to there not being the log cluster matching the beginning and ending keywords of the sample log in the log cluster matching the length of the sample log, creating a log cluster by using the sample log; and determining similarities between all log signatures in the log cluster matching the beginning and ending keywords of the sample log and the sample log; in response to any similarity among all the similarities being greater than a preset threshold, inserting the sample log into a log cluster to which a log corresponding to the similarity greater than the preset threshold belongs; or in response to any similarity among all the similarities not being greater than the preset threshold, creating a log cluster by using the sample log.

9. The non-transitory computer-readable storage medium according to claim 7, wherein the compactness is defined as a ratio of a constant to a total length in the log, and the separation is defined as a discrepancy between discrete item sets of two different logs;

wherein, the discrete item set refers to a set of discrete item pairs, and the discrete item pairs refer to all item pairs generated by every two fields in each log.

10. The non-transitory computer-readable storage medium according to claim 7, wherein parsing the log by using the obtained plurality of log clusters and the determined quality score comprises:

acquiring a target log to be parsed;

filtering out irrelevant information in the target log by using the regular expression;

determining a matched log cluster among the obtained plurality of log clusters according to a length and beginning and ending keywords of the target log, and determining an adaptive similarity between the target log and the matched log cluster;

determining an adaptive similarity threshold for the target log and the matched log cluster according to the quality score; and determining whether the adaptive similarity is greater than the adaptive similarity threshold; in response to the adaptive similarity being greater than the adaptive similarity threshold, inserting the target log into the matched log cluster; in response to the adaptive similarity not being greater than the adaptive similarity threshold, creating a log cluster by using the target log.

11. The non-transitory computer-readable storage medium according to claim 7, wherein after parsing the log by using the obtained plurality of log clusters and the determined quality score, the method further comprises:

splitting a log cluster meeting a preset splitting condition; wherein, the splitting condition comprises that a number of logs in the log cluster exceeds a preset log quantity threshold.

12. The non-transitory computer-readable storage medium according to claim 11, wherein splitting the log cluster meeting the preset splitting condition comprises:

determining a position in the log cluster to be split where a number of fields is less than a preset field quantity threshold as a candidate position; and calculating Gini values of all candidate positions, and splitting the log cluster according to a candidate position corresponding to a maximum Gini value in the log cluster to be split.

13. The non-transitory computer-readable storage medium according to claim 11, wherein after splitting the log cluster meeting the preset splitting condition, the method further comprises:

searching for logs with consecutive occurrences of keywords and with identical other fields in each log cluster obtained by splitting, and taking searched logs as candidate logs to be deleted; and deleting all logs except a log with a least occurrences of the keywords of the candidate logs to be deleted.

14. A server, comprising:

at least one processor;

a memory communicatively connected with the at least one processor; and a communication component communicatively connected with a log parsing device, wherein, the communication component receives and sends data under the control of the at least one processor;

the memory stores instructions executable by the at least one processor, and the instructions are executed by the at least one processor to enable the at least one processor to execute a method for parsing logs, the method comprises:

acquiring, by the at least one processor, sample log data, wherein the acquired sample log data includes a plurality of sample logs, irrelevant information is filtered out from the plurality of sample logs by a regular expression;

performing, by the at least one processor, clustering processing on the acquired sample log data according to a length of each sample log in the acquired sample log data, and beginning and ending keywords of each sample log in the acquired sample log data, to obtain a plurality of log clusters;

determining, by the at least one processor, a quality score of each log cluster of obtained the plurality of log clusters, wherein determining the quality score of the each log cluster of the plurality of log clusters comprises:

determining the quality score of the each log cluster according to a compactness of each log cluster of all log clusters and a separation between different log clusters, wherein the quality score is a normalized product of the compactness and the separation; and parsing, by the at least one processor, a log online by using the obtained plurality of log clusters and determined quality scores of the obtained plurality of log clusters so as to be used for construction of program workflow and anomaly detection in a system;

wherein parsing the log includes determining an adaptive similarity threshold for the log using the quality scores of the obtained plurality of log clusters; and wherein parsing the log online by using the obtained plurality of log clusters and the determined quality scores of the obtained plurality of log clusters comprises:

acquiring a target log to be parsed;

filtering out irrelevant information in the target log by using the regular expression;

determining a matched log cluster among the obtained plurality of log clusters according to a length and beginning and ending keywords of the target log, and determining an adaptive similarity between the target log and the matched log cluster;

determining an adaptive similarity threshold for the target log and the matched log cluster according to a quality score of the matched log cluster; and determining whether the adaptive similarity is greater than the adaptive similarity threshold; in response to the adaptive similarity being greater than the adaptive similarity threshold, inserting the target log into the matched log cluster; in response to the adaptive similarity not being greater than the adaptive similarity threshold, creating a log cluster by using the target log; wherein determining the matched log cluster among the obtained plurality of log clusters according to the length and beginning and ending keywords of the target log comprises:

using the length and the beginning and ending keywords of the log to be parsed directly as keys;

acquiring a log cluster whose log length and beginning and ending keywords match the log to be parsed from the plurality of log clusters by querying cache.

15. The server according to claim 14, wherein performing the clustering processing on the acquired sample log data according to the length and the beginning and ending keywords of the each sample log in the acquired sample log data comprises:

processing the each sample log in the acquired sample log data as follows:

determining whether there is a log cluster matching a length of a sample log; in response to there being the log cluster matching the length of the sample log, acquiring the log cluster matching the length of the sample log, or in response to there not being the log cluster matching the length of the sample log, creating a log cluster by using the sample log;

determining whether there is a log cluster matching the beginning and ending keywords of the sample log in the log cluster matching the length of the sample log; in response to there being the log cluster matching the beginning and ending keywords of the sample log in the log cluster matching the length of the sample log, acquiring the log cluster matching the beginning and ending keywords of the sample log, and in response to there not being the log cluster matching the beginning and ending keywords of the sample log in the log cluster matching the length of the sample log, creating a log cluster by using the sample log; and determining similarities between all log signatures in the log cluster matching the beginning and ending keywords of the sample log and the sample log; in response to any similarity among all the similarities being greater than a preset threshold, inserting the sample log into a log cluster to which a log corresponding to the similarity greater than the preset threshold belongs; or in response to any similarity among all the similarities not being greater than the preset threshold, creating a log cluster by using the sample log.

16. The server according to claim 14, wherein the compactness is defined as a ratio of a constant to a total length in the log, and the separation is defined as a discrepancy between discrete item sets of two different logs;

wherein, the discrete item set refers to a set of discrete item pairs, and the discrete item pairs refer to all item pairs generated by every two fields in each log.

17. The server according to claim 14, wherein after parsing the log by using the obtained plurality of log clusters and the determined quality score, the method further comprises:

splitting a log cluster meeting a preset splitting condition;

wherein, the splitting condition comprises that a number of logs in the log cluster exceeds a preset log quantity threshold.

18. The server according to claim 17, wherein splitting the log cluster meeting the preset splitting condition comprises:

determining a position in the log cluster to be split where a number of fields is less than a preset field quantity threshold as a candidate position; and calculating Gini values of all candidate positions, and splitting the log cluster according to a candidate position corresponding to a maximum Gini value in the log cluster to be split.

19. The server according to claim 17, wherein after splitting the log cluster meeting the preset splitting condition, the method further comprises:

searching for logs with consecutive occurrences of keywords and with identical other fields in each log cluster obtained by splitting, and taking searched logs as candidate logs to be deleted; and deleting all logs except a log with a least occurrences of the keywords of the candidate logs to be deleted.

* * * * *